Jan. 4, 1966      F. M. WOOD ET AL      3,226,976
ULTRASONIC INSPECTION SYSTEM
Filed Feb. 12, 1962      4 Sheets-Sheet 3
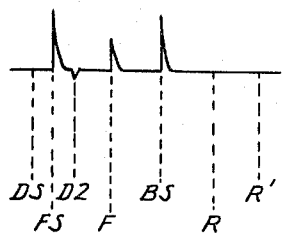
Fig. 4
Fig. 9
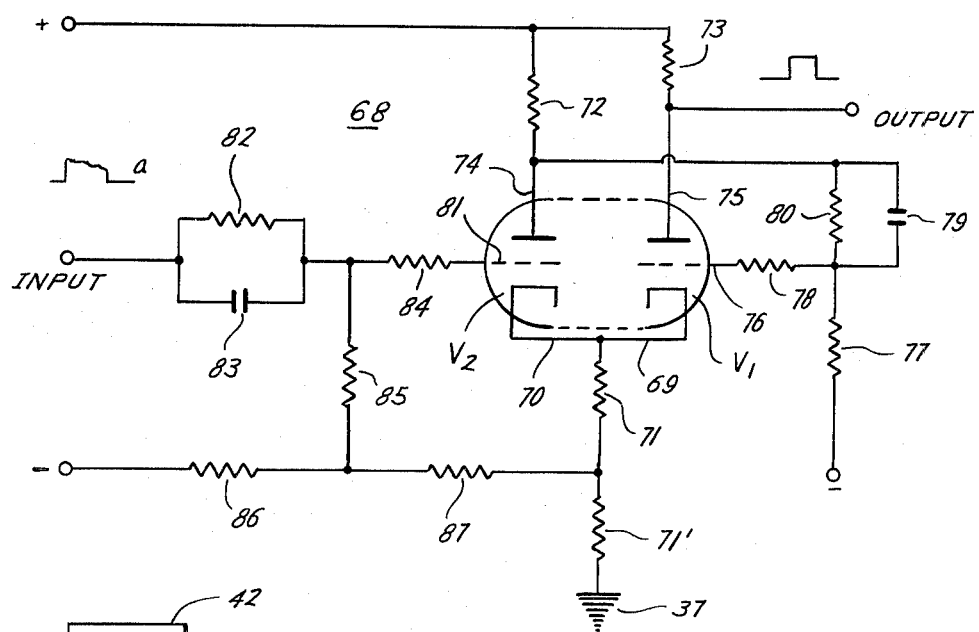
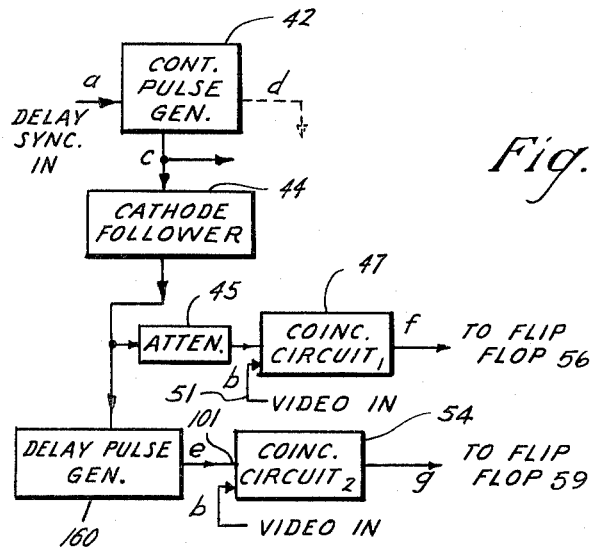
Fig. 6
Fenton M. Wood
Noel B. Proctor
INVENTORS
BY Arnold and Roylance
ATTORNEYS Jan. 4, 1966     F. M. WOOD ET AL     3,226,976
ULTRASONIC INSPECTION SYSTEM
Filed Feb. 12, 1962     4 Sheets-Sheet 4

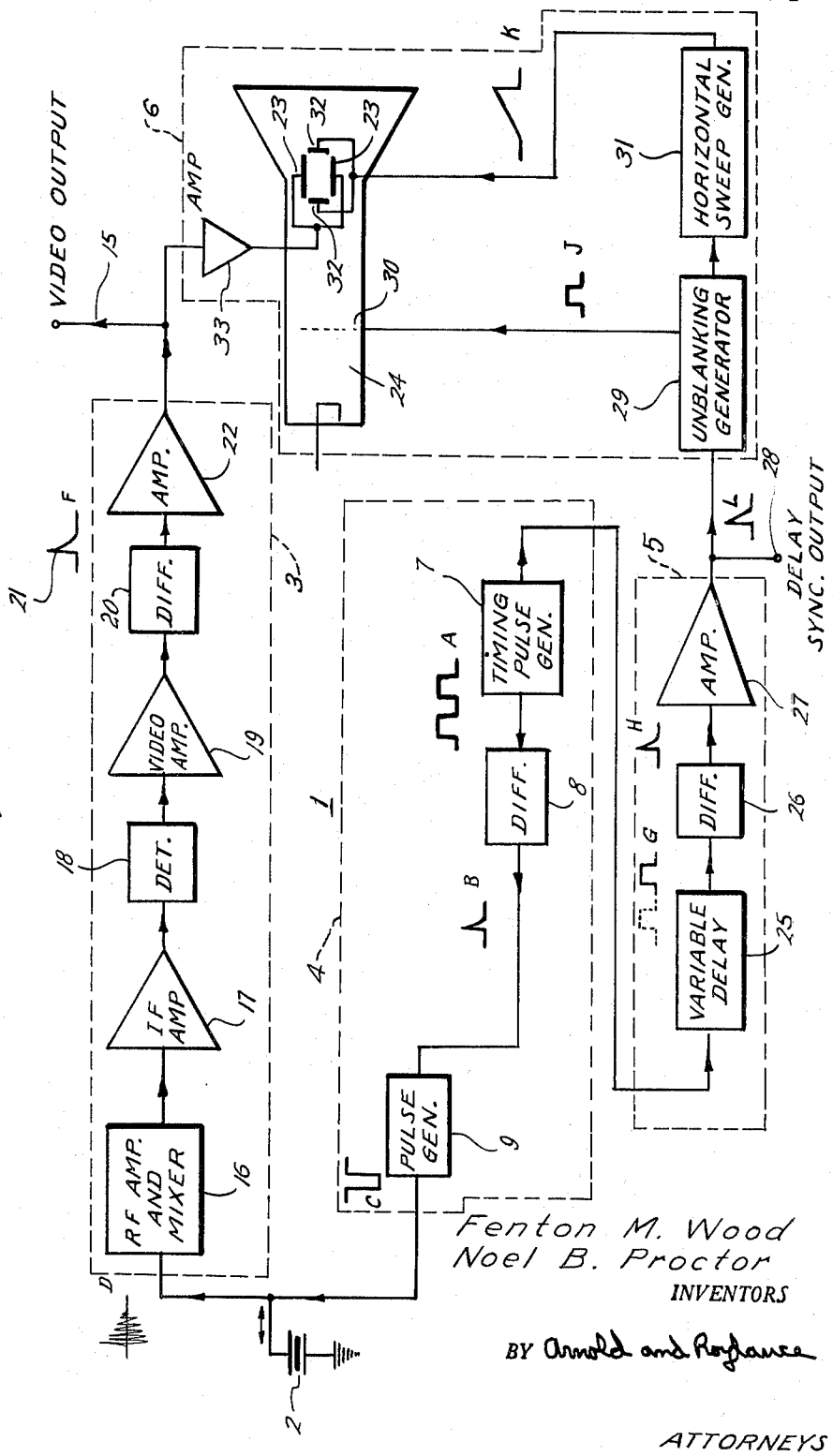

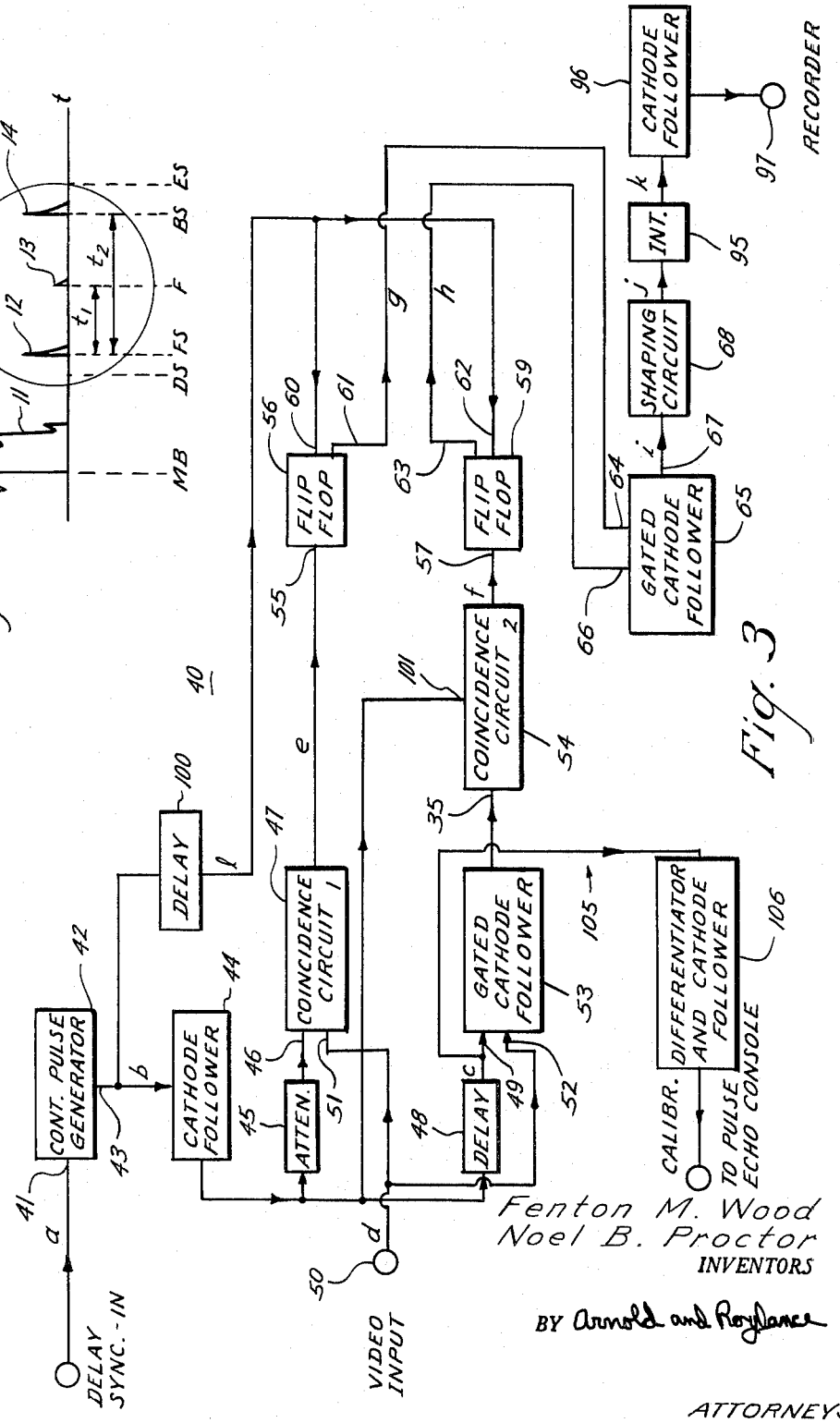

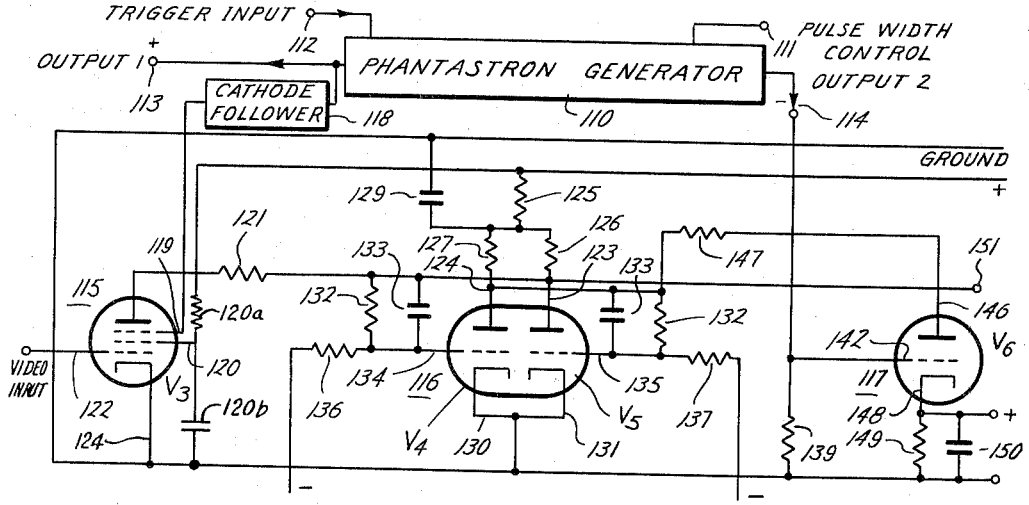

Fig. 5 a DELAY SYNC.
b CONT. PULSE GEN.
c DELAYED CONT. PULSE
d VIDEO PULSE TRAIN
e COINCID 47
f COINCID 54
g FLIP FLOP     56
h FLIP FLOP     59
i GATED CATH. FOL.
j PULSE SHAPER
k INTEGRATOR
l RESET PULSE a DELAY SYNC.
b VIDEO
c PHANT. OUTPUT 113
d PHANT. OUTPUT 114
e DELAY PULSE GEN. OUTPUT 160
f COINCID. 47
g COINCID. 53
h FLIP FLOP     56
i FLIP FLOP     59

Fenton M. Wood
Noel B. Proctor
     INVENTORS

BY Arnold and Roylance

ATTORNEYS

United States Patent Office 3,226,976
Patented Jan. 4, 1966

3,226,976
ULTRASONIC INSPECTION SYSTEM
Fenton M. Wood, Sugarland, and Noel B. Proctor, Houston, Tex., assignors, by mesne assignments, to American Machine & Foundry Company, New York, N.Y., a corporation of New Jersey
Filed Feb. 12, 1962, Ser. No. 172,677
6 Claims. (Cl. 73—67.9)

The present invention relates to apparatus for inspecting an object for defects and dimension changes with a beam of ultrasonic energy. More particularly, the present invention makes use of the ultrasonic echo pulses recerived after transmitting an ultrasonic pulse into an object to determine the precise depth and location of a defect or dimension change and presents the information as a continuous electrical signal that varies with the depth of the defect or structural change.

The technique of locating defects in an object by transmitting an ultrasonic energy pulse and receiving the echo pulses from the object is illustrated in United States Patent No. 2,280,226, F. A. Firestone. As the ultrasonic pulse enters the object, the first echo pulse that returns is produced by the reflection due to the acoustical impedance transition at the boundary between the transmitting medium and the object. The first echo pulse is generally referred to as the front surface pulse (FS pulse). If a defect is located within the object in the path of the ultrasonic beam, a smaller energy echo pulse will follow the front surface pulse, the time intervening depending on the depth of the defect from the front surface of the object. As the ultrasonic pulse reaches the interface between the back surface of the object and the surrounding medium, an echo pulse is produced following the front surface and defect pulses in the time relation. The latter echo pulse is generally referred to as the back surface pulse (BS pulse). Accordingly, a transducer that transmits the ultrasonic pulse and receives the echo pulses generates a pulse train that consists of the transmitted pulse, the front surface pulse, a defect pulse (or pulses if more than one flaw is present in the object), and a back surface pulse.

The main purpose of the present invention is to determine the distance from the front surface of the object to the defect, or to the back surface of the object, if no defect is present. The aforementioned pulse train is analyzed by the apparatus of the present invention to generate an electrical signal which varies with the time spacing between the front surface pulse and the defect pulse or back surface pulse, if no defect is present.

In considering the design and improvement of ultrasonic defect detection equipment, a primary concern is the fact that the time intervals involved are exceedingly small, and the apparatus must operate to accurately respond over many cycles of operation. Each operating cycle furnishes the pulse train that contains the intelligence for determining the depth of the defect, or front surface to back surface distance, and the information from each cycle must be presented in a convenient manner to provide a single electrical signal that varies with the desired intelligence.

Consistent with the high requirements of precise time measurements, the present invention has for one of its objects to provide an ultrasonic inspection system that quantitatively determines the depth of a defect within an object, or the front to back surface dimension of the object.

Another object of the present invention is to provide an ultrasonic inspection system that analyzes the echo pulses received after transmission of an ultrasonic pulse into an object and produces an electrical signal that continuously varies with the time spacing between the front surface echo pulse and a subsequent echo pulse.

A further object of the present invention is to provide an ultrasonic flaw detection system that analyzes a number of pulse trains received from an ultrasonic inspection apparatus, each pulse train comprising pulses in time relation representing the transmitted pulse, the front surface pulse, a defect pulse (if a defect is present), and the back surface pulse, and producing an electrical signal that varies with the time relation between the front surface pulse and the next following pulse in each pulse train.

A further object of the invention is to provide an ultrasonic inspection system having circuit features that enable a precise measurement of the small time intervals between pulses in a pulse train and that is capable of operating at a rapid speed to analyze successive pulse trains.

Other objects of the present invention will become apparent from a reading of the following description, wherein the drawings, forming a part of the specification, are as follows:

FIG. 1 is a block diagram of one typical form of a pulse echo console, showing the major components in block diagram form and a few of the waveforms at various points in the system;

FIG. 2 shows the video output signal furnished by the pulse echo console and the portion of the video output signal that is displayed on the cathode ray tube of the pulse echo console;

FIG. 3 is a block diagram illustrating one form of a recording adapter that analyzes the pulses furnished by the pulse echo console;

FIG. 4 illustrates the waveforms appearing on the cathode ray tube of the pulse echo console, including the calibration pulse coupled back from the recording adapter;

FIG. 5 illustrates the waveforms in time relationship at various points in the block diagram of FIG. 3 for the recording adapter;

FIG. 6 shows an alternative arrangement for a portion of the recording adapter of FIG. 3 in block diagram form;

FIG. 7 is a schematic circuit diagram in partial block diagram form showing a preferred circuit for the flip-flop unit and related circuits of the recording adapter in FIG. 3;

FIG. 8 illustrates the waveforms in time relationship at various points in the recording adapter shown in FIG. 3 when the arrangement of FIGS. 6 and 7 is substituted and combined therewith;

FIG. 9 is a circuit diagram of a typical pulse squaring circuit for use in the recording adapter shown in FIG. 3.

Briefly, the present invention employs a pulse echo console that is arranged to transmit an ultrasonic pulse and receive echo pulses from the test object. A pulse train is produced that represents the time relation of the transmitted pulse, the front surface pulse, a defect pulse (if a defect is found in the object), and a back surface pulse. The pulse train is fed to a recording adapter that analyzes a portion of the pulse train. The electrical circuit in the recording adapter provides a series of control pulses that results in an output pulse having uniform amplitude and a width that varies with the time interval between the front surface pulse and the defect pulse, or back surface pulse if no defect pulse is present. The output pulse from each of a series of pulse trains is integrated, and the ultimate output signal from the recording adapter is continuous in indicating the distance from the front surface of the object to a defect or from the front surface to the back surface, if no defect is present. When the recording adapter output signal is presented in a permanent form on a moving recording sheet, it is immediately apparent whether the test object is of uniform thickness, and/or whether a defect is present in the test object. The specific circuit arrangement and other features of the ultrasonic inspection system are important to the improvement achieved from the present invention.

Two units form the main parts of the illustrated apparatus embodying the present invention, a pulse echo console 1 (FIG. 1) and a recording adapter 40 (FIG. 3). A number of variations exist for the individual arrangement of the pulse echo console 1 and numerous devices are available that will serve the purpose for the present invention. The arrangement shown in FIG. 1 is merely illustrative of one form of apparatus that produces the desired pulse train output used in connection with the recording adapter 40.

The pulse echo console 1 (FIG. 1) comprises a transducer 2, a radio frequency detection channel 3, a transducer pulse control channel 4, a delay sync generating channel 5, and an indicator circuit 6.

The transducer pulse timing channel 4 comprises a timing pulse generator 7 that continuously produces a number of uniformly shaped and spaced rectangular pulses, shown as waveform 1(A). The output of timing pulse generator 7 is coupled to a differentiator 8 that converts each pulse into sharp trigger pulse 1(B). The trigger pulse 1(B) is coupled to pulse generator 9 that produces a negative high voltage pulse 1(C) to excite transducer 2.

For ultrasonic inspection, the transducer 2 is generally a piezo-electric crystal immersed in a fluid medium, such as water, and creates a pressure wave that is transmitted to a test object located in the fluid. The transducer 2 also serves as a receiver for converting pressure waves in the form of echoes from the test object into electrical signals that are coupled to the radio frequency detection channel 3.

Before going into a further explanation of the pulse echo console 1, it is helpful at this time to consider the nature of the electrical signal transmitted from the transducer 2 to the radio frequency detection channel 3. The electrical signal from transducer 2 is a series of pulses that forms a pulse train for each excitation of transducer 2. The timing generator pulses of waveform 1(A) are spaced in time relation to allow for reception of all the important echo pressure waves from the test object before the transducer 2 is excited again. Referring to FIG. 2, the initial pulse 11 in the pulse train 10 produced by transducer 2 results from the excitation of the transducer 2 and is generally referred to as the main bang pulse (MB pulse). A short time later and spaced along the time abscissa of FIG. 2 is echo pulse 12 produced by the interface between the fluid medium and the front surface of the test object. The ultrasonic pulse travels into the test object and, if a flow is located in its path, a reflection occurs that arrives at the transducer 2 and forms a defect pulse 13 spaced in time with respect to the front surface pulse 12 by an interval T-1. If no further defects are encountered by the ultrasonic pulse, the next echo pulse returning to the transducer 2 is due to the interface at the back surface of the test object and the fluid medium to produce a back surface pulse 14, spaced in time with respect to front surface pulse 12 by a time interval T-2.

The pulse train 10, shown in FIG. 2, appears at the video output 15 of the pulse echo console 1 after processing in the radio frequency detection channel 3. The main bang pulse 11 and echo pulses 12, 13, and 14 produced in the transducer 2 have a radio frequency carrier due to the use of a piezo-electric crystal that has a particular mechanical resonant frequency. Each of the pulses is converted to a new frequency carrier according to conventional radio frequency technique in amplifier and mixer 16, and then coupled to an intermediate frequency (I.F.) amplifier 17, and demodulated in a detector 18 to remove the radio frequency carrier and leave the envelope of the pulse train 10. The output of detector 18 is coupled through a video amplifier 19 to a differentiator 20, wherein each of the pulses forms a pulse having a sharp leading edge 21 corresponding to the beginning of each pulse, as shown in waveform 1(F). The output from differentiator 20 is coupled through a pulse amplifier 22 and appears at video output terminal 15 and is also coupled through amplifier 33 to the vertical deflection plates 23 of a cathode ray tube 24 in indicator circuit 6.

Indicator circuit 6 includes a cathode ray tube 24 and the control for the cathode ray tube 24 is provided through delay sync generating channel 5.

The delay sync generating channel 5 receives identical timing pulses as received by differentiator 8 from timing pulse generator 7. The output from timing pulse generator 7 is delayed by means of a variable delay unit 25 interposed between the timing pulse generator 7 and a differentiator 26. By adjusting the variable delay unit 25 the starting time for the output pulse from differentiator 26, as shown in waveform 1(H), may be varied with respect to the time the transmitted pulse is initiated from transducer 2. After the differentiation of the timing pulse in differentiator 26 and amplification in amplifier 27, the delay sync output pulse 1(L) is coupled to an unblanking generator 29 which is in turn coupled directly to the grid 30 of cathode ray tube 24. As the unblanking generator 29 is actuated by the delay sync output pulse 1(L), a horizontal sweep generator 31 is triggered by the unblanking generator 29 to initiate a sweep voltage 1(K) that is coupled to the horizontal deflection plates 32 of cathode ray tube 24.

The operation of pulse echo console 1 may be easily understood by referring again to FIG. 2, taken in connection with FIG. 1. Timing pulse generator 7 may produce 2000 pulses per second. Each timing pulse generator output pulse is differentiated and triggers the pulse generator 9 to thereafter excite the transducer 2 and create an ultrasonic pulse in the fluid medium. The main bang pulse 11 and the front surface pulse 12, defect pulse 13, and back surface pulse 14 produced in transducer 2 are amplified and detected in radio frequency detection channel 3, and the resultant video output is a train of pulses 10 each having a sharp leading edge. The delayed sync output at terminal 28 is also a sharp leading edge pulse 1(L) which is initiated at a predetermined time after the transmitter pulse, as determined by the variable delay 25.

The indicator circuit 6 displays the video output signal, as illustrated in FIG. 2, by modulating the vertical deflection of the cathode ray tube 24 with the pulse train 10 and sweeping the horizontal deflection plates 32 with a standard linear saw tooth voltage 1(K). Since the indicator 6 is not triggered for operation until after the main bang pulse 11, the cathode ray tube 24 does not display the main bang pulse 11 and only displays the front surface pulse 12, defect pulse 13, and back surface pulse 14, as shown within the circle of FIG. 2. Generally, a one microsecond delay is sufficient to eliminate response to the main bang pulse 11 and variable delay unit 25 may be adjusted while visually inspecting the indicator 6 to insure that the delay is sufficient to eliminate response to the main bang pulse 11. The time of the delay sync output pulse 1(L) is adjusted to activate the indicator 6 just before the front surface pulse 12, as indicated by the point on the axis of FIG. 2 designated as DS. The horizontal sweep of the cathode ray tube 24 ends at the point identified as ES in FIG. 2, just following the presentation of the back surface pulse 14.

Summarizing the outputs from the pulse echo console 1, the video output terminal 15 furnishes a train of pulses 10 corresponding to the time relation between the main bang pulse 11, front surface pulse 12, defect pulse 13, and back surface pulse 14 in the transducer 2. The delay sync output is a sharp trigger pulse that occurs after the main bang pulse 11 and just before the front surface pulse 12.

The important intelligence conveyed by the pulse train 10 is in the form of the time relationship between the front surface pulse 12 and the defect pulse 13, or the front surface pulse 12 and the back surface pulse 14. The recording adapter 40, shown in FIG. 3, analyzes the pulse train 10 and selects the desired intelligence from the time relationship of the aforementioned pulses and presents it in the form of an electrical signal that continuously varies with the time interval between the aforementioned pulses in successive pulse trains. The ultrasonic inspection apparatus operates continuously and as various points in the test object are inspected by successive ultrasonic pulses, the electrical output signal of the recording adapter 40 is a continuous indication of the presence of any defect, the depth of the defect, or the distance between the front surface and back surface of the test object where no defect is present.

As mentioned previously, the other main unit of the illustrative ultrasonic inspection system incorporating the present invention is the recording adapter 40, shown in one preferred embodiment in FIG. 3. In general, the recording adapter 40 receives the delay sync pulse from terminal 28 and the video pulse train 10 and causes the front surface pulse 12 to initiate a first control signal, and the next following pulse, either a defect pulse 13, or back surface pulse 14, to initiate a second control signal. Means is provided to receive the two control signals and generate an output signal only while the first control signal is present and until the second control signal is produced, corresponding to the time interval between the front surface pulse 12 and the next following pulse. The output signal is shaped into a constant amplitude pulse and each of the output signals from successive pulse trains is integrated to produce a signal proportional to the pulse widths and consequently proportional to the distance between the front surface pulse 12 and a defect pulse 13, or between front surface pulse 12 and the back surface pulse 14, if no defect is present. The integrated output signal is recorded along a time axis to continuously display the variations in amplitude.

A more detailed undestanding of the operation of recording adapter 40 may be gained by reference to the block diagram of FIG. 3 and the time relationship of signals shown in FIG. 5. The delay sync pulse, shown in FIG. 5–a, occurs in time relation to the video pulse train 5–d just after the main bang pulse (Mb) and before the front surface pulse (FS) by proper adjustment of the variable delay unit 25 in the pulse echo console 1. The delay sync pulse triggers the control pulse generator 42 through lead 41 to produce an output 43 of a rectangular waveform 5–b that continues for a predetermined time at least sufficient to include the back surface pulse of a pulse train. A mono-stable multivibrator, or a phantastron generator are typical of the types of pulse generators that are suitable for control pulse generator 42. As will be explained later, it is desirable to have some way of adjusting the duration of control pulse generator output 43.

The control pulse generator output 43 is coupled to a cathode follower 44 of conventional design, such as preferred circuit 43 described in "Handbook of Preferred Circuits—Navy Aeronautical Electronics Equipment," prepared by the National Bureau of Standards, Department of Commerce for the Bureau of Aeronautics, Department of Navy, identified as NAVAER 16-1-519, published Sept. 1, 1955, and available through the Superintendent of Documents, United States Government Printing Office, Washington 25, D.C. (The last mentioned reference will be referred to hereinafter as HPC and the particular circuit number found in the text will follow the abbreviated title.) The output of cathode follower 44 is coupled through an attenuator 45 to input 46 of a coincidence circuit 47 and separately through a delay unit 48 to an input 49 of a gated cathode follower 53, and to input 101 of coincidence circuit 54. The attenuator 45 is simply a voltage reducing circuit that may take many forms and is designed to reduce the amplitude of the pulse applied to coincidence circuit input 46, corresponding to any reduction in pulse amplitude at gated cathode follower input 49 caused by the delay unit 48. In this manner, coincidence circuit input 46 and gated cathode follower input 49 receive substantially identically the same pulse, except the pulse at gated cathode follower input 49 is delayed for a predetermined time. The delay unit 48 may take many forms and a suitable type of delay circuit is a lumped-parameter delay line, or a combination of controlled time period mono-stable multivibrators and a differentiating circuit. The text "Pulse and Digital Circuits," by Millman and Taub, published by McGraw-Hill Book Company, 1956, on page 291 illustrates a typical lumped-parameter delay line that may be used in the recording adapter 40. (The last mentioned text will be referred to hereinafter as PDC followed by the page or pages on which the illustrative circuit is found.)

The video pulse train 10 from the pulse echo console 1 is coupled to an input terminal 50 of the recording adapter 40 and thence to an input 51 of coincidence circuit 47 and also to an input 52 of gated cathode follower 53.

Coincidence circuits 47 and 54 may take a number of forms that are well-known in the art, such as illustrated in PDC 397 to 400 inclusive. These circuits are well-known as "AND" circuits, wherein a number of pulses of common polarity appear at separate inputs and a negative output signal is produced only at the time that a positive input signal is simultaneously received at each input. The gated cathode follower 53 is essentially the same in operation as a coincidence circuit, in that the output from the gated cathode follower 53 occurs only at the time that signals are received simultaneously at inputs 49 and 52. A typical circuit that may be used for gated cathode follower 53 is illustrated in United States Patent No. 2,970,-077, R. H. Hinckley et al., issued April 23, 1957. The circuit illustrated in the aforementioned patent may be slightly redesigned to accommodate a particular type of input signal. For example, two of the grids can be negatively biased so that a negative output signal is provided only when a positive potential is applied to both of the grids simultaneously.

The output from gated cathode follower 53 is coupled to input 35 of coincidence circuit 54. The output from coincidence circuit 54 is coupled to the SET input 57 of a flip-flop circuit 59 and the output of coincidence circuit 47 is coupled to a SET input 55 of a flip-flop circuit 56. Flip-flop circuit 56 also has a RESET input 60 and an output 61, while flip-flop circuit 59 has a RESET input 62 and an output 63. Basically, flip-flop circuits 56 and 59 are bi-stable circuits having respective SET inputs 55 and 57 that trigger the circuit into a SET state after a negative input pulse is received and respective RESET inputs 60 and 62 that trigger the circuit back to the initial RESET state when a positive input pulse is received. Flip-flop circuit 56 is designed so that a positive pulse, as shown in FIG. 5–g, is provided at an output 61 while the circuit is in the SET state, and flip-flop circuit 59 is designed so that a negative pulse, as shown in FIG. 5–h, is provided at output 63 when the circuit is the SET state. The flip-flop circuits 56 and 59 may be generally described as having unsymmetrical triggering, in that a uni-polarity trigger pulse at input 55 initiates the change in state and subsequent trigger pulses at that input will not cause the flip-flop circuit 56 to return to the original state. Similarly, a uni-polarity trigger pulse at the other input will cause the flip-flop circuit 56 to return to the original state, but subsequent trigger pulses at input 60 will not cause the flip-flop circuit 56 to change its state. Typical types of circuits that may be used for the flip-flop circuits 56 and 59 are illustrated in PDC 159–161 inclusive. In addition, it must be recognized that the standard circuits such as described in PDC 156–159 are also suitable through proper adjustment to work satisfactorily as flip-flops 56 and 59.

The output 61 of flip-flop circuit 56 is directly coupled to an input 64 of a gated cathode follower 65, and the output 63 of flip-flop circuit 59 is directly coupled to input 66 of gated cathode follower 65. Gated cathode follower circuit 65 is designed to provide a positive output signal when flip-flop circuit 56 is in the SET state at the same time flip-flop circuit 59 is in the RESET state, or, in other words, the cathode follower circuit provides an output signal only when a positive potential is provided by flip-flop circuit 56 at the same time that output signal from flip-flop circuit 59 is absent. The gated cathode follower circuit does not provide an output signal if flop-flop circuit 56 is in the RESET state where it provides no output signal, or if flip-flop circuit 59 is in the SET state or it provides a negative output signal. Thus, the output pulse provided by the gated cathode follower circuit commences with occurrence of a front surface pulse (FS) and is terminated with occurrence of the next subsequent pulse in the pulse train, which, as shown in FIG. 5 is the flaw pulse (F). A suitable gated cathode follower circuit is shown as the first stage of the circuit shown in PDC 512.

The output from gated cathode follower 65 is coupled to a shaping circuit 68 that transforms the output into a rectangular output pulse of uniform height. A typical circuit for the pulse shaper 68 is illustrated in FIG. 9. The representative circuit includes a dual-triode amplifier having sections V–1 and V–2. Cathodes 69 and 70 are joined together and coupled to the ground 37 through series resistors 71 and 71'. Positive voltages are applied to the shaping circuit through resistor 72 to plate 74 of section V–2 and through the resistor 73 to plate 75 of section V–1. A negative voltage is applied to the grid 76 of section V–1 through series resistors 77 and 78, and a network comprising capacitor 79 and resistor 80 in parallel is coupled between plate 74 of section V–2 and the junction between series resistors 78 and 77. The input to the pulse shaping circuit 68 is coupled to grid 81 of section V–2 through a network consisting of a resistor 82 and capacitor 83 in parallel connected at one end to the junction point between resistors 84 and 85 connected respectively to grid 81 of section V–2 and the junction points between resistors 86 and 87. Negative bias voltage is applied to the free end of resistor 86, and the free end of resistor 87 is coupled at the junction between resistors 71 and 71' in the cathode circuit of the dual-triode section.

The operation of pulse shaping circuit 68 may be summarized as follows, considering first the quiescent state of vacuum tube sections V–1 and V–2. V–2 has a negative voltage applied from the biasing network of resistors 86 and 87, and resistors 85 and 84 serve to reduce grid current. In this state, V–2 is not conducting and therefore a high plate voltage from V–2 is coupled to the grid of V–1 through resistors 80 and 78. The grid 76 of V–1 is nearly zero and section V–1 is therefore fully conductive, providing low plate voltage at the output. When a positive pulse is fed to the grid of V–2 through the network of resistor 82 and capacitor 83, V–2 conducts and the grid of V–1 is driven negative. This action causes the plate voltage of V–1 to increase. At the trailing edge of the incoming pulse, the grid of V–2 is driven in a negative direction and this action in turn drives the plate of V–1 negative. Since V–1 is operated between cut off and saturation, a pulse is produced at the plate of V–1 which has a very sharp rise and fall time and is essentially a flat top pulse. The leading and trailing edges of the input waveforms correspond in turn to the leading and trailing edges of the output waveform in time relationship. Thus, a pulse having a uniform amplitude and the precise width of the input pulse from gated cathode follower 65 is produced in the output of shaping circuit 68. The output is taken from plate 75 of section V–1 to produce the positive going output shown as waveform 5–j.

The output from pulse shaping circuit 68 is coupled to an integrator 95. The pulse of waveform 5–j is integrated and, since the height of the pulse is constant, the integrator output varies with the pulse width. Consequently, the integrator output is a continuous electrical signal that varies with the time difference between the front surface pulse and the next following pulse, either a defect pulse or the back surface pulse, for a number of cycles of operation of pulse echo console.

Suitable integrators are described in the text "Milli-microsecond Pulse Techniques," by Lewis and Wells, published by Pergamon Press, London, 1954, page 272. The output of the integrator 95 is coupled through a cathode follower 96, that may have the same design as the cathode follower 44 previously described, and thence to the recorder 97. Recorder 97 may be a strip chart, wherein the movement of the chart represents the time axis and the integrator output varies the position of the recording pen at right angles to the direction of chart travel. The resultant waveform produced on the recorder 97 is shown as waveform 5–k.

The combined operation of the pulse echo console 1 and the portion of the recording adapter 40 thus far described, can be easily understood by referring to FIGS. 1 and 3 and the waveforms shown in FIGS. 2 and 5. As mentioned previously, the pulse echo console 1 produces a pulse train 10, and the function of the recording adapter 40 is to continuously indicate the time relationship of the front surface pulse 12 and defect pulse 13 or between the front surface pulse 12 and back surface pulse 14, if no defect is present. The pulse train 10 is coupled to the video input 50 and appears at inputs 51 of coincidence circuit 47 and input 52 of gated cathode follower 53. The recording adapter is activated by means of the delay sync pulse that occurs in time relation after the main bang pulse 11 and before the front surface pulse 12, as shown in waveforms 5–a and 5–d. The delay sync pulse initiates the output from control pulse generator 42 consisting of a rectangular square wave of predetermined time duration and, after amplitude decrease in attenuator 45, the pulse generator output appears at input 46 of coincidence circuit 47. The coincidence circuit 47 does not produce an output when the main bang pulse appears at input 51, since the output from the control pulse generator 42 has not been initiated by delay sync pulse 28 at that time. The next pulse, namely the front surface pulse 12, does produce an output from coincidence circuit 47, since the control pulse generator 42 initiates an output at the time the front surface pulse 12 appears at coincidence input 51. The coincidence circuit output shown in FIG. 5–e causes flip-flop 56 to change into the SET state and produce a positive output signal 5–g at gated cathode follower input 64.

Coincidence circuit 54 is not actuated by the front surface pulse 12 due to the delay introduced by delay unit 48 which is adjusted so that the output of control pulse generator 42 reaches the input 49 of gated cathode follower 53 just after the front surface pulse is produced. The next pulse in the pulse train 10 initiates an output from gated cathode follower 53 and, since the output of control pulse generator 42 is already present at input 101 of the coincidence circuit 54, the output from gated cathode follower 53 produces an output from coincident circuit 54, triggering flip-flop circuit 59 to the SET state. The transition of flip-flop circuit 59 produces a negative output waveform 5–h at input 66 of gated cathode follower 65.

As explained previously, gated cathode follower 65 initiates an output positive signal at the time that a signal is applied to input 64, and this output continues until a negative signal is received at input 66. The resultant output from the gated cathode follower is shown in waveform 5–i and the time duration of the pulse varies precisely with the time duration between the front surface pulse 12 and the next following pulse, either defect pulse 13 or the back surface pulse 14. The output of gated cathode follower 65 is transformed to a uniform amplitude pulse in shaping circuit 68 and integrated by integrator 95 into a continuous electrical signal, whose amplitude varies with the width of the output pulse of gated cathode follower 65. Each pulse train 10 produced during a cycle of operation of the pulse echo console 1 provides an output pulse from the gated cathode follower 65, and the integration of these output pulses furnishes the continuous electrical signal that varies with the front surface to flaw or front surface to back surface distance in the test object. Each of the time relationships just previously mentioned are illustrated in FIG. 5, wherein the various waveforms are shown for the recording adapter 40.

Since it is important to be sure that the output of control pulse generator 42 does not reach the gated cathode follower 53 until after the front surface pulse has occurred, calibration channel 105, comprising a differentiator and cathode follower 106 is coupled at input 49 of gated cathode follower 53. The calibration output is transformed in polarity by a suitable phase inverter (not shown) and coupled to the vertical deflection plates 23 of the cathode ray tubes 24 to produce a deflection opposite to the deflection of pulse train 10. FIG. 4 illustrates the presentation on the cathode ray tube 24, showing the pulse D2, the calibration pulse, appearing in the proper time relationship with respect to the front surface pulse. If the time relationship of the delayed output of control pulse generator 42 is not correct, delay unit 48 may be adjusted to provide the desired time relationship.

The recording adapter 40 is reset for each cycle of operation of the pulse echo console 1. The reset operation must be tied in with the generation of the pulse train in a time sense, so that the recording adapter 40 is receptive to the front surface pulse 12, defect pulse 13, and back surface pulse 14, but does not respond to pulses occurring after the back surface pulse 14. Control of the reset operation is conveniently tied back through to the timing pulse generator 7 of the pulse echo console 1 to enable the system to perform uniformly over a number of cycles of operation.

In the illustrative arrangement of FIG. 3, the output 43 from control pulse generator 42 serves to control the reset phase of the operation of flip-flop circuits 56 and 59. The output from control pulse generator 42 is coupled through a delay unit 100 to RESET inputs 60 and 62 of flip-flop circuits 56 and 59, respectively. In this manner, the delay unit 100 prevents the RESET pulse from reaching the flip-flop circuits until a predetermined time after a cycle of operation has taken place in the recording adapter 40.

The delay sync pulse initiates the output from the control pulse generator 42 and this output pulse is delayed in time, as shown in waveform 5–L, to form a reset pulse that triggers the flip-flop circuits 56 and 59 back to the original state. The reset pulse shown in 5–L occurs after the back surface pulse 14 and resets flip-flop circuits 56 and 59 even if a defect pulse 13 and back surface pulse 14 are not received.

An illustrative example of a flip-flop circuit that may be used for either of flip-flop circuits 56 or 59 is shown in FIG. 7. In this instance, the control pulse generator takes the form of a phantastron pulse generator 110 having a pluse width control input 111 and a trigger input 112. The phantastron generator 110 produces two output signals after receiving a trigger pulse a first output at terminal 113 of positive polarity and a second output at terminal 114 of negative polarity. A representative phantastron generator is shown in HPC 56, including the description of the preferred circuit on page 57. The two phantastron generator outputs begin and end at the same time, as illustrated in FIGS. 8c and d, respectively.

The illustrative circuit of FIG. 7 comprises triode vacuum tube V–3, forming a part of the coincidence circuit 115, twin triode vacuum tube having sections V–4, and V–5 forming a part of the flip-flop circuit 116, and triode vacuum tube V–6, forming a part of the reset circuit 117.

The positive going output from the phantastron pulse generator 110 is coupled through a cathode follower 118 to the suppressor grid 119 of vacuum tube V–3, and the screen grid 120 of vacuum tube V–3 receives a positive potential through a series resistor 120a. A capacitor 120b is connected between the screen grid and ground. The cathode 124 of vacuum tube V–3 is connected to ground, and the video pulse train is applied to the control grid 122 of vacuum tube V–3. Accordingly, after the phantastron generator 110 has received a delay sync output pulse at input 112, a rectangular pulse appears at outputs 113 and 114, and coincidence circuit 115 will produce an output signal when a pulse in the pulse train 10 is received.

The output from the coincidence circuit 115 is coupled through a resistor 121 directly to the plate 123 of vacuum tube section V–5 of the flip-flop circuit 116. Each of the plates 123 and 124 of vacuum tube sections V–5 and V–4 receive a positive potential through a common resistor 125 in series with independent resistors 126 and 127 coupled directly to the respective plates. The junction between resistors 125, 126, and 127 is by-passed to ground by capacitor 129 and the cathodes 130 and 131 of vacuum tube V–4 and V–5 are coupled together and returned to ground. The conventional flip-flop circuit interconnection between the plate of one vacuum tube section and the grid of the other vacuum tube section is formed by networks consisting of a resistor 132 and capacitor 133 in parallel, one network connected between plate 123 and grid 134, and the other network being connected between plate 124 and grid 135. A negative potential is applied to the grids through separate resistors 136 and 137 for vacuum tube sections V–4 and V–5, respectively.

The reset circuit 117 is coupled to the flip-flop circuit 116 at plate 124 of section V–4 through a series resistor 147 connected at the other end to plate 146 of triode V–6. The phantastron output 114 is coupled to the grid 142 of triode V–6. The cathode 148 of vacuum tube V–6 is coupled to ground through a resistor 149 and a capacitor 150 in parallel and a positive potential is applied directly to cathode 148.

The reset operation of the circuit, shown in FIG. 7, is easily understood by considering the cycle of operation described in connection with FIG. 3 and referring to the time relation of waveforms in FIG. 8.

The delay sync output pulse 28 at trigger input 112 initiates the phantastron outputs at terminals 113 and 114. As mentioned previously, the time relationship of the delay sync pulse 28 is such that coincidence circuit 115 produces an output at the time the output 113 from phantastron generator 110 and the front surface pulse 12 from the pulse train 10 is received. Until the output at 114 from phantastron generator 110 is produced, flip-flop circuit 116 is clamped by vacuum tube V–6 and the associate circuit to prevent the transition to the SET state. Vacuum tube V–6 normally is conducting and prevents the flip-flop circuit 116 from altering its state. At the time phantastron generator 110 produces the negative output at 114, the vacuum tube V–6 is cut off and flip-flop circuit 116 is unclamped and ready to be triggered to the other state. An output signal received from coincidence circuit 115 can initiate the transition of flip-flop circuit 116 during the time that the phantastron generator output provides the unclamping pulse at 114. As soon as the pulse generator output at 114 is removed, the flip-flop circuit 116 is again clamped and returned to the RESET state.

The circuit shown in FIG. 7 may be used for either of flip-flop circuits 56 or 59, as shown in FIG. 3. The illustrated circuit is shown connected as flip-flop circuit 56 and this reset arrangement eliminates the need for delay unit 100 and substitutes a phantastron generator 110 for the control pulse generator 42. In the case where the circuit shown in FIG. 7 is substituted for the flip-flop circuit 59, the output at 113 from phantastron generator 110 is coupled through a delay unit of the same kind as delay unit 48 in FIG. 3 and then directly to one point input of the coincidence circuit 115, preferably eliminating gated cathode follower 53. Proper circuit adjustment, with particular emphasis that resistors 121 and 147 insures that the flip-flop circuit 116 will reset as soon as output 114 is removed, even though the delayed phantastron output 113 is still present on the suppressor grid 119 for a short period thereafter.

To eliminate all possibility that the flip-flop circuit 115 will not be reset instantly and to improve the overall precision and dependability of the circuit, an arrangement such as shown in FIG. 3 may be used, wherein a gated cathode follower, such as 53 is employed. Thus, the voltage appearing at the suppressor grid 119 is removed at the same time as the declamping voltage is removed and the flip-flop will return immediately to the original state. The gated cathode follower 53 insures that an output is produced only when the delayed output of control pulse generator 42 is present at input 49 and one of the pulses in the pulse train 10 is simultaneously presented at the input 52. The use of a gated cathode follower 53 in the arrangement shown in FIG. 3 is optional, but does insure a precise and sharp cut off and reset of the flip-flop circuit.

Another reset arrangement for the recording adapter 40 is shown in FIG. 6, taken in conjunction with the waveforms of FIG. 8. Instead of coupling the output of control pulse generator 42 directly to the coincidence circuit 54 through gated cathode follower 53, a delayed pulse generator 160 is triggered by the output of control pulse generator 42 to initiate a delayed pulse shown as waveform 8–e that begins after the output from control pulse generator 42 and ends prior to the termination of the control pulse generator output. In this manner, the input 101 of coincidence circuit 54 is removed prior to the time that the reset operation begins, and the flip-flop circuit 59 is immediately returned to the original state. The delayed pulse generator 160 may be incorporated in lieu of the gated cathode follower 53 shown in FIG. 3 or combined with the circuit illustrated in FIG. 7 and arranged to function with the coincidence circuit 115 and flip-flop circuit 116.

Summarizing the main features of the present invention, the output signal from recording adapter 40 is a continuously varying electrical signal that offers immediate indication of the location of defects within the test object, or the variation in wall thickness. The high precision and rapid operation of the pulse echo console 1 and the recording adapter 40 permit a thorough inspection of the test object and a significant improvement in the speed with which the object may be scanned for defects.

While the present invention has been disclosed in one or more specific embodiments, it must be recognized that numerous variations on the disclosed arrangements are within the skill of one in the art after studying the above description. The present invention is not to be limited to the specific circuits disclosed, which are merely representative of several preferred circuits, but it is to be limited only by the scope and interpretation of the appended claims.

What is claimed is:
1. An ultrasonic inspection apparatus, comprising,
a pulse echo console adapted to produce an electrical pulse train for each ultrasonic transmission pulse;
control generator means having an input adapted to receive a trigger signal that initiates an output signal;
first coincidence means having first and second inputs and an output,
said first input being coupled to the output of said control means and said second input being coupled to receive pulse trains from said pulse echo console;
signal delay means;
second coincidence means having first and second inputs and an output;
said first input being coupled through said delay means to the output of said signal generator means and said second input being coupled to the second input of said first coincidence means and thereby adapted to receive the same pulse trains;
first signal generator means having an input coupled to the output of said first coincidence means for initiating an output signal upon receiving a signal from said first coincidence means;
second signal generator means having an input coupled to the output of said second coincidence means for initiating an output signal upon receiving a signal from said second coincidence means;
gate means having a first input coupled to the output of said first signal generator means and a second input coupled to the output of said second signal generator means, and arranged to produce an output signal initiated at the receipt of a signal from said first signal generator and terminated at the receipt of a signal from the second signal generator;
means coupled to output of said gate means for indicating the time duration of said output signal from said gate means;
said delay means being adjusted to delay the output signal from said control signal generator means from reaching the first input of said second coincidence means until after one of the pulses in a pulse train initiates an output from said first coincidence means and thereafter permitting said second coincidence means to initiate an output signal upon receipt of a subsequent pulse in the pulse train.
2. An ultrasonic inspection apparatus, as described in claim 1, wherein,
each of said signal generators produces a continuous output signal upon receiving an input signal;
said gate means produces an output signal only during the time interval when the output from said first signal generator is received and until the output from said signal generator is received; and
said indicating means shapes the output signal from gate means to a uniform amplitude, and integrates successive output signals from said gate means to produce an electrical signal that varies in response to the time difference between said first pulse and next following pulse in successive pulse trains.
3. The device, as described in claim 1, wherein,
each of said first and second signal generators initiates a continuous output signal when a signal is received at the respective inputs; and further
means for terminating said output signal from each of said pulse generators and resetting said first and second signal generators.
4. The device, as described in claim 3, wherein,
said reset means is coupled to said control generator means and transmits the output signal from said control generator to terminate the output signal of each of said first and second pulse generators after the output signal from said gate means has been produced and before the next pulse train is received.
5. The device, as described in claim 3, wherein,
each of said first and second signal generators are flip-flop circuits having a first input coupled to the respective coincidence means output and a second input coupled to said reset means, the output signal from the respective coincidence means causing said flip-flop circuit to change its state and the reset means returning the flip-flop circuit to the original state, the change in state of the flip-flop circuit being the output signal coupled to said gate means.
6. A device, as described in claim 5, wherein,
each of said flip-flop circuits has a means for clamping and returning said circuit to said original state; and said reset means transmits a control signal before said second pulse is received to declamp said flip-flop circuits and permits an input signal from the respective coincidence means to change the state of the respective flip-flop circuit.

References Cited by the Examiner

UNITED STATES PATENTS

| 2,562,449 | 7/1951 | DeLano | 73—67.8 |
| 2,672,392 | 3/1954 | Caples et al. | 73—67.8 X |
| 2,736,193 | 2/1956 | Valkenburg et al. | 73—67.9 |
| 2,883,860 | 4/1959 | Henry | 73—67.9 |
| 2,888,824 | 6/1959 | Henry | 73—67.9 |
| 2,971,372 | 2/1961 | Lewis et al. | 73—67.9 |
| 3,011,338 | 12/1961 | Furon | 73—67.9 |

FOREIGN PATENTS 842,653  7/1960  Great Britain.

RICHARD C. QUEISSER, Primary Examiner.

ROBERT EVANS, Examiner.